US008116989B2

(12) United States Patent
Journade et al.

(10) Patent No.: US 8,116,989 B2
(45) Date of Patent: Feb. 14, 2012

(54) DEVICE AND METHOD FOR DETERMINING A RUNWAY STATE, AIRCRAFT COMPRISING SUCH A DEVICE AND PILOTING ASSISTANCE SYSTEM USING THAT RUNWAY STATE

(75) Inventors: Jerome Journade, Toulouse (FR); Fabien Pitard, Toulouse (FR); Dimitri Barraud, Toulouse (FR); Jean-Michel Builles, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 396 days.

(21) Appl. No.: 12/429,643

(22) Filed: Apr. 24, 2009

(65) Prior Publication Data

US 2009/0292483 A1 Nov. 26, 2009

(30) Foreign Application Priority Data

Apr. 24, 2008 (FR) ..................................... 08 52777

(51) Int. Cl.
*G06F 19/00* (2011.01)
*G08G 5/00* (2006.01)

(52) U.S. Cl. ............. 702/34; 701/16; 340/945; 340/947
(58) Field of Classification Search .................... 702/34, 702/141; 701/16, 18; 340/945, 947
See application file for complete search history.

(56) References Cited

U.S. PATENT DOCUMENTS

| | | | | |
|---|---|---|---|---|
| 4,122,522 | A | 10/1978 | Smith | |
| 7,797,095 | B2 * | 9/2010 | Rado | 701/80 |
| 2006/0243857 | A1 | 11/2006 | Rado | |
| 2010/0036551 | A1 * | 2/2010 | Lacaze et al. | 701/18 |

FOREIGN PATENT DOCUMENTS

WO WO 2008/127468 A2 10/2008

* cited by examiner

*Primary Examiner* — Bryan Bui
(74) *Attorney, Agent, or Firm* — Oblon, Spivak, McClelland, Maier & Neustadt, L.L.P.

(57) ABSTRACT

A device and associated method for determining an airport runway state includes a device that determines a runway state and is placed on board an aircraft. The device collects measured deceleration data of the aircraft during taxiing of the aircraft on the runway. Then at least one runway state is estimated from the collected data, and the estimate is transmitted to another aircraft or to a broadcasting center during the other aircraft's runway approach.

18 Claims, 10 Drawing Sheets

DEVICE AND METHOD FOR DETERMINING A RUNWAY STATE, AIRCRAFT COMPRISING SUCH A DEVICE AND PILOTING ASSISTANCE SYSTEM USING THAT RUNWAY STATE

BACKGROUND

This invention relates to a device and a method for determining a runway state, as well as to an aircraft landing and/or takeoff assistance system and method, and to aircraft equipped with such devices and systems.

During the landing and takeoff, and more generally the taxiing phases of an airplane, knowledge of the surface state of the runway is of major importance. Prediction of the braking performance of the airplane indeed depends on this knowledge. It thus is possible:

- to best estimate the distance necessary for stopping the airplane in a concern for safety,
- not to overestimate this stopping distance necessary for bringing the airplane to a standstill and therefore not to overly penalize utilization operations of the runway and the airplane.

Now, braking performances of an airplane on a so-called contaminated runway are very difficult to predict because of the difficulty in knowing reliably and precisely the contribution of the runway state to the deceleration of the airplane, in particular in terms of adhesion and of projection and displacement drags in the case of a deep contaminant. The contaminants can be any element happening to be deposited on the "original" runway, as for example rubber deposited during previous landings, oil, rainwater forming a more or less uniform layer on the runway, snow, ice, etc.

Knowledge of such a contribution of the runway can seem beneficial for improving landing systems such as the one described, for example, in the document FR-2897593.

This knowledge also can prove important for increasing the takeoff security of airplanes, the latter having to estimate, for example, the runway point of no return no longer permitting a completely safe emergency braking on the remaining runway portion.

Initial solutions for estimating the runway state already have been set up, but measurements of the runway adhesion today are very difficult, ineffective, unreliable and hard to transpose from the context of the measurement means used to that of an airplane taxiing on the actual runway.

There is known in particular the measurement of adhesion via traction engines or "mu-meters," for example towed vehicles or special cars, that provide results that are disparate, potentially inconsistent among themselves, non-representative for an airplane because of different scales of phenomena such as the stresses and performance of the tires, and which moreover necessitate a closing of the runway during the measurements.

In practice there also is recourse to visual and manual inspection of the runway by control which then provides a type and a depth of contaminant which are or are not compatible with the performance calculation means of the airplanes. This approach, however, provides only an indication highly dependent on the place where this inspection was conducted.

Also, there are known "Reported Braking Actions" which in fact are the experience of the pilot of the previous airplane concerning his braking performances with a division into four simple levels: good/medium/poor/nil (in practice indicated by the following English terms: "good"/"medium"/"poor"/"nil"), from which it is possible to manually inform the airplane on approach for landing. But this solution is subjective, depends on the airplane and takes into account contributions other than the braking of the wheels (the pilot being unable to identify the precise part of the various braking means of his airplane: aerodynamics, engine thrust or counter-thrust and braked wheels).

On the contrary, this invention relates to a solution for estimating a runway state that is more objective and representative of the behavior of airplanes.

In this sphere, analysis solutions applicable later on the ground already have been developed for estimating a posteriori the state of the runway at the time of an incident or an accident in service, or for validating trial flights in "real time."

These solutions generally rely on measurements of the deceleration of the airplane during landing. Then on the ground, delayed treatments are performed in order to estimate the adhesion of the runway on the basis of this measured deceleration, subtracting therefrom in particular aerodynamic, engine and contaminant components or contributions deriving from models based on other measurements performed on the airplane or outside.

These treatments performed take into account the type of airplane involved, since the measurement of deceleration alone does not allow an easy utilization by another airplane.

Moreover, these treatments are long, manual and not compatible with an intensive operation of an airport where an estimation of the state of the runway is required in a brief period before the following airplane in turn executes a phase of taxiing on the runway, either for landing or for taking off.

Furthermore, there is known from the document US 2006/243857 a method and a device for estimating characteristics relating to a landing runway. A real-time treatment is carried out, during which various airplane or external parameters are acquired and recorded. From these recorded parameters, an estimation of the deceleration due solely to braking is performed on the basis in particular of the deceleration $A_x$ of the airplane, the engine thrust $A_{reverse\ thrust}$ and the aerodynamic drags $A_{drag}$. A friction profile "μ" then is established in order to determine whether or not the airplane is at braking limit, and to let the pilot know accordingly.

These information items, however, simply cannot be used in a time period satisfactory for informing the airplanes in approach.

SUMMARY

The invention thus seeks to overcome the disadvantages of the prior art by proposing in particular a concise runway state determination with an on-board treatment of the measurements performed in order to inform the following airplanes as quickly as possible.

For this purpose, the invention applies in particular to a device for determining a runway state, placed on board an aircraft, comprising measurement means capable of collecting at least one datum on deceleration of the aircraft during a phase of taxiing of the aircraft on the said runway, and comprising in particular:

- a first means for estimating at least one runway state information item from the said at least one measured datum;
- a means for transmission, to at least one other aircraft, possibly via an appropriate airport broadcasting center, and/or a broadcasting center, of the said at least one runway state information item, in which the means for estimating a runway state information item comprises:

a second means for estimating at least one adhesion profile according to the speed of the said aircraft, with the aid of the said at least one measured datum;

a means for comparing the said estimated adhesion profile with a series of adhesion profiles of runway states each corresponding to a characterization of the runway state;

a means for determining at least one runway state characterization according to the comparisons made by the said comparison means.

Correlatively, the invention also applies to a method for determining a runway state, performed on board an aircraft, comprising a step for measuring at least one datum on deceleration of the aircraft during a phase of taxiing of the aircraft on the said runway, and comprising in particular:

a first step of estimating at least one runway state information item from the said at least one measured datum;

a step of transmitting, to at least one other aircraft and/or a broadcasting center, the said at least one runway state information item, in which the said first step of estimating a runway state information item comprises:

a second step of estimating at least one adhesion profile according to the speed of the said aircraft, with the aid of the said at least one measured datum;

a step of comparing the said estimated adhesion profile with a series of runway state adhesion profiles each corresponding to a characterization of the runway state;

a step of determining at least one runway state characterization according to the said comparison made.

The on-board treatments make possible an automatic estimation of the runway state in a relatively short period, even though the airplane may not have completed its taxiing phase. In this way, the following airplanes are informed in due time.

Furthermore, the on-board treatments and associated devices are simplified because they are implemented in the actual aircraft, the characteristics and parameters of which are easily accessible in (quasi-)real time.

It is understood here that a runway state information item is intended to describe this state as independently as possible from any consideration of the airplane having performed this measurement. To this end, the information item obtained is clearly more objective concerning the state of the runway and can be used by any other airplane having characteristics different from the first. By way of illustration, such an information item can take on the form of a level of adhesion of the runway, of an aquaplaning or equivalent information item, of an information item relating to contaminant drags or of a characterization of the runway state by identification of a type and of a depth of contaminant.

In this way, according to the invention, the information item turned over has been at least partially decorrelated from the characteristics of the airplane so as to best describe the runway state effectively for the following airplanes. As this description or estimation is effected on board the airplane, unlike the prior art, treatments on the ground are simplified and it thus is possible to inform the other airplanes directly.

Moreover, through use of “typical” adhesion profiles, concise characterizations of the runway state that can be used in a manner similar to the criteria generated by the pilots in the “Reported Braking Action” process can be obtained.

By thus providing that each of the reference profiles corresponds to a precise and concise characterization of the contaminant, in particular by its type and its depth, it becomes easy, by virtue of the arrangements of this invention, to provide this concise information item to the following airplanes in a brief period.

In practice, the correlation between the adhesion profile determined during taxiing of the airplane and one of these reference profiles makes it possible from then on to determine automatically a precise characterization of the runway state, in particular that of the profile having the best correlation with the estimated adhesion profile.

In one embodiment, the device comprises a means for determining a quasi-nil adhesion threshold speed, aquaplaning type, skidding, in the said estimated adhesion profile, the said comparison means comprising a means for calculating a normed difference between the said profiles over a range of speeds excluding a neighborhood close to the said threshold speed. It is understood here that the threshold speed is the speed of occurrence of aquaplaning or the like. In particular, the comparison of profiles is performed over the entire range of measured speeds with the exception of the zone (neighborhood) around the threshold value. In this way, errors due to the discontinuity of the aquaplaning speed are avoided.

According to another characteristic of the invention, a step of determining limitations of the braking capabilities of the said aircraft is provided, so as to indicate whether the said estimated adhesion profile is a maximal or minimal profile. It then is envisaged to transmit this information to the broadcasting center and to other aircraft on approach in order to improve landing assistance.

In one embodiment, the said runway state information item is associated with at least one information item on position of the aircraft on the said runway. As it happens, not all the aircraft land on the same runway portions. In this way the determined runway state can be associated with this position on the runway. By putting such additional information together, it thus is possible to obtain a precise mapping of the landing runway.

In particular, the said first estimating means is equipped for carrying out estimations by partitioning the said runway into a plurality of runway portions according to position information items. By way of example, the runway can be divided into three portions. This division of the runway thus makes it possible to improve the correlation between the adhesion of the runway and the position of the airplane on the runway.

In one embodiment, the device also comprises a means for validating the said runway state information item estimated by a member of the crew of the said aircraft, in particular a pilot, prior to transmission to the said broadcasting center. With this action, the pilot confirms that the determined runway state corresponds to his knowledge of outside conditions. In this way the efficacy of the device and of the associated method is enhanced. This validation also can back up the pilots in their subjective experience.

According to one particular characteristic of the invention, the device comprises a means for estimating the reliability of the measured data or estimations made prior to transmission, the said transmission of the said estimated runway state information item being undertaken if the said measured data or estimations made are reliable. This arrangement ensures the consistency of the automatic device and makes it possible to minimize the errors transmitted to the broadcasting center and to the other airplanes. By way of illustration, this reliability can be estimated by the signal-to-noise ratio of the measured data or by a sufficient level of correlation (with respect to a threshold value) between compared adhesion profiles.

In one embodiment, there is transmitted at least one information item from an information item on adhesion of the said runway, for example one indication from among four levels, an average value of adhesion of the runway or the said estimated adhesion profile according to the groundspeed, an indication of a risk of aquaplaning or of skidding, in particularly according to the zones of the runway, and an information item relating to contaminant drags, for example the presence of such drags and the severities thereof.

In one embodiment, the said at least one measured datum comprises the ground speed of the said aircraft and the deceleration of the said aircraft, and the device comprises a second means for estimating an adhesion profile according to the speed of the said aircraft, with the aid of the said at least one measured datum, the said second estimating means comprising:

- a means for modeling aerodynamic contributions of the said aircraft and contributions of the engines of the said aircraft during the said taxiing phase,
- a means of determining a braking profile from the data on deceleration and on aerodynamic and engine contributions, the said second means for estimating the adhesion profile moreover being equipped for determining the said adhesion profile according to the said braking profile and a modeling of the vertical stresses sustained by the braked wheels of the said aircraft. The aerodynamic and engine contributions in particular can be worked out from theoretical profiles calculated on the basis of measured data.

It was able to be determined during tests that the contaminant on the runway also made a contribution during taxiing of the aircraft, in particular during a braking. Thus it is provided that the second means for estimating the adhesion profile furthermore comprises a means for modeling contaminant contributions (projection, compression and/or displacement of the contaminant) due to the presence of a contaminant on the said runway, and is equipped for determining the said adhesion profile according to the said modeling of contaminant contributions. In particular, any useful information on a possible contaminant of the runway and allowing this modeling can be obtained during the approach phase of the aircraft prior to landing through communication with the airport as mentioned above. The estimations made then are more precise.

In general, a variant to the use of the contaminant contribution in the estimation of the adhesion profile consists in that the said runway state adhesion profiles, the reference ones, include a contribution relating to a contaminant drag induced by a contaminant corresponding to each of the runway states, respectively. Such contaminant drags depend on the airplane in question. The calculations to be carried out in the aircraft thus are limited. Moreover, higher-quality results are obtained because the runway state adhesion profiles are specific to a known type of contaminant, so that the associated contaminant contribution is calculated and introduced in precise manner into the profiles.

In one embodiment seeking to reduce the noise inherent in the measuring devices, there is provided a means for filtering the said measured data capable of smoothing out the said data over a predetermined time period, for example by averaging them. This arrangement applies in particular to the inertial acceleration measurement systems.

According to another characteristic seeking, for its part, to implement a better modeling and therefore characterization of each portion of the runway, there is provided a means for filtering the said measured data capable of determining various phases during the said taxiing, the said first estimation means then being equipped for acting independently on each of the said phases. Models specific to each of the taxiing phases then can be provided.

According to a particular characteristic of the invention, the said first step of estimating a runway state information item is activated starting from a threshold ground speed of the said aircraft. Thus the essential part of the taxiing/braking of the aircraft is of interest, the end of taxiing being less representative of the braking and therefore of the state of the runway. In particular a compromise is sought between the quantity of data acquired and treated in order to obtain an effective estimation of the runway state and an early treatment in order to transmit the result of this treatment to the aircraft on approach in due time. Thus, by way of example, it can be considered that a threshold speed of 20 knots constitutes a good compromise.

Correlatively, the method and the device according to the invention can comprise steps and means, respectively, relating to the characteristics set forth above.

The invention also applies to an aircraft comprising at least one device for determining a runway state such as set forth above.

Optionally, the aircraft can comprise means relating to the device characteristics set forth above.

The invention also relates to a piloting assistance system for aircraft, in particular for the landing thereof, comprising at least one device such as set forth above provided on at least one aircraft, and a broadcasting center capable of receiving a runway state information item determined by the said device and capable of transmitting this runway state information item to at least one other aircraft, in particular in approach phase. The utilization of this information item by the aircraft in approach phase can be varied, for example by display thereof for the pilot or by its use as input for a landing assistance system.

Likewise, the invention also applies to a piloting assistance system for aircraft, comprising a plurality of devices for determining a runway state such as set forth above and provided in a corresponding plurality of aircraft, and a broadcasting center, the said broadcasting center being capable:

- of receiving a runway state information item determined by the said plurality of devices;
- of merging the said runway state information items received; and
- of transmitting at least one runway state information item resulting from the said merging to at least one other aircraft, so as to provide an enhanced runway state mapping to the said at least one other aircraft.

In this way there is obtained an improved mapping of the landing runway for the aircraft in approach phase. Of course, different policies for merging and retention of information items can be set up, such as the one for taking into account meteorological changes at the airport, or even age of the information items and replacement thereof with more recent corresponding information items (even position on the runway).

Correlatively, there is provided an aircraft landing assistance method, comprising steps relating to the means of the above system.

BRIEF DESCRIPTION OF THE DRAWING

Other features and advantages of the invention also will become evident in the description below, illustrated with the attached drawings, in which.

DETAILED DESCRIPTION

Figure 1:
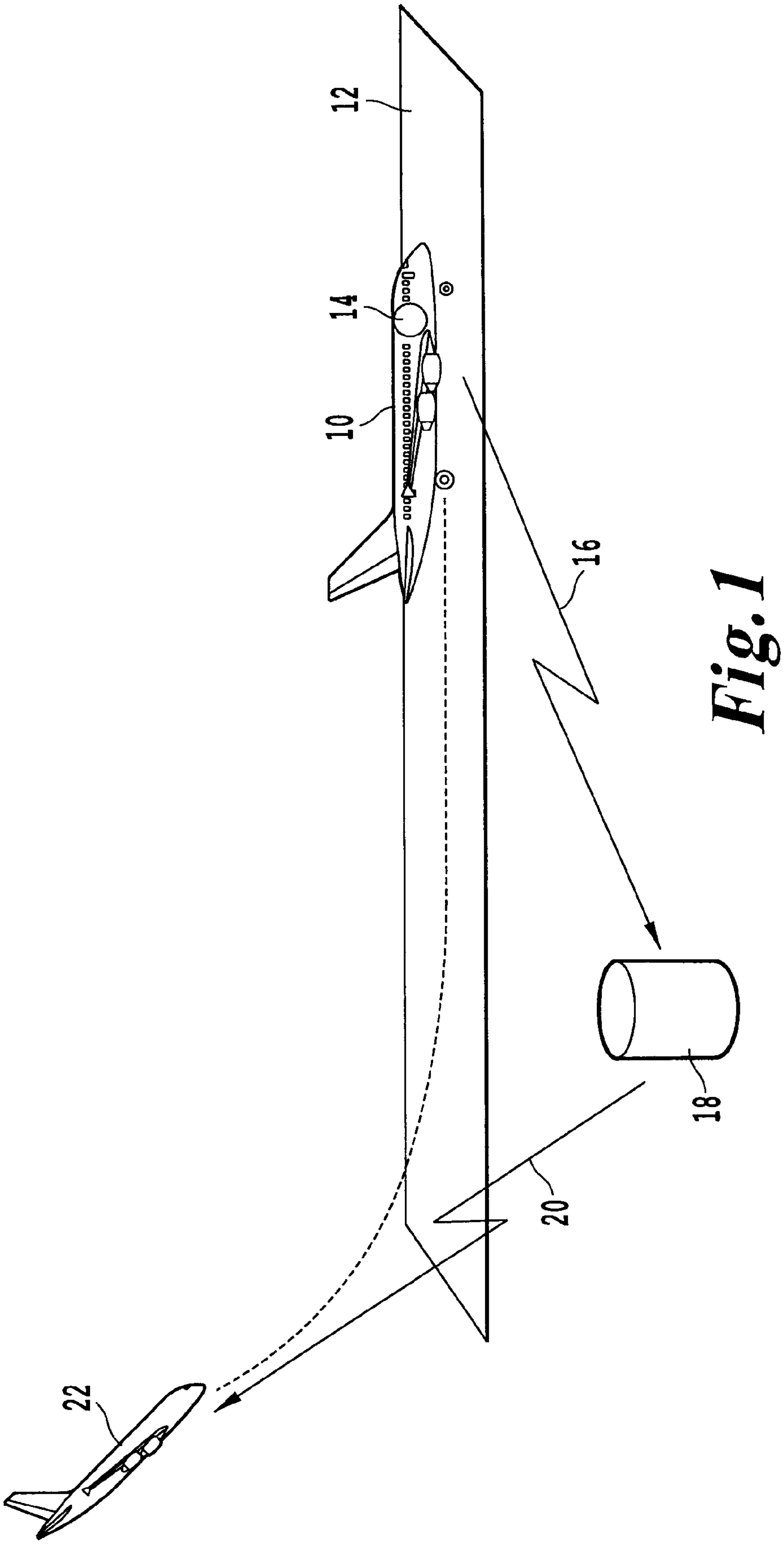
FIG. 1 shows a general view of a system for the implementation of this invention.

On FIG. 1, an airplane 10 at the end of the taxiing/braking phase on an airport runway 12 has been shown. This airplane 10 is equipped with a device 14 that is the object of the invention, capable of determining a state of the runway 12.

Through a communication link 16 provided in particular for this purpose, airplane 10 communicates the runway state that it has determined to a central station 18 of the airport. The latter, after internal treatments if need be, communicates (20) a runway state to airplanes 22 in approach phase for landing or those ready for takeoff.

The latter in turn will officiate as airplane 10 at the end of their landing in order to enhance the central station 18 with additional information items on the runway state, in order to achieve in particular a still more complete mapping of the runway 12.

Indeed, the central station 18 acquires and records these runway state information items originating from the device of the airplane 10 and of the preceding airplanes, then merges them, the data from the other airplanes making it possible to reconstruct a temporal and spatial information item concerning the runway. Generally, this treatment and merging phase is conducted on the ground in order, for example, to be used in analyses of the FOQA ("Flight Operational Quality Assurance") type. As a variant, such a phase can be conducted on board airplanes 22 that collect in de-coordinated manner the data from other airplanes (of the same company, for example) already having landed.

Figure 2:
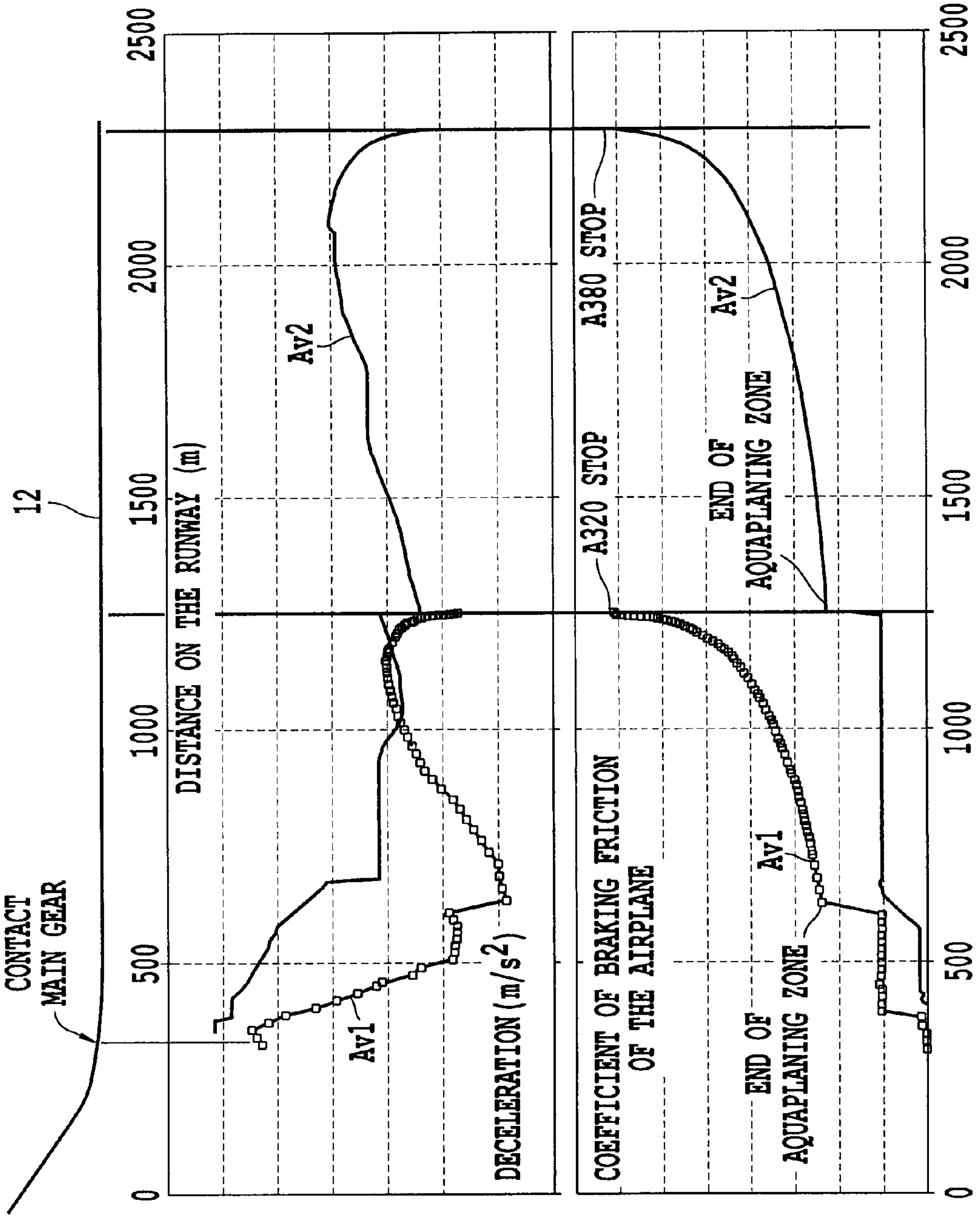
FIG. 2 is a graph illustrating the differences in breaking capability and in deceleration of two airplanes on the same runway.

As will be seen later, the determination of a runway state according to an exemplary embodiment of the invention takes into account:

- the position of airplane 10 on runway 12: since not all the airplanes taxi over the entirety of the runway length, the description of the adhesion is associated with a position on the runway, at least longitudinal, or even lateral, so as to map runway 12;
- the speed of the airplane during the measurement (or estimation) of adhesion. Indeed, this adhesion generally increases when the speed of the airplane in relation to the ground decreases. Moreover, depending on the type and depth of contaminant, the phenomenon of aquaplaning or the like can be encountered for (ground) speeds in excess of a threshold value (variable from one airplane to another), and for which adhesion is quasi-nonexistent. The test the results of which are provided in FIG. 2 illustrates quite clearly the importance of taking the speed into account. In this test, a single-aisle airplane Av1 of the A320 (commercial name) type is landing on a runway contaminated with water ¼" (or approximately 6.5 mm) deep. This airplane Av1 is going to stop on the first 1200 m of runway, with an adhesion coefficient μ of approximately 0.1 to 0.3 (regulation "water ¼" model, level reported by a pilot as "medium" to "poor"). A large carrier Av2 of the A380 (commercial name) type is landing immediately after the airplane Av1 on the same runway state. It experiences an aquaplaning over 1200 m, with an adhesion on the order of 0.05 ("poor" or even "nil" level), as a result of its higher approach speed. Therefore, on the same runway portion there is a factor of two to six between the adhesions seen by two different airplanes, if this speed effect is not taken into account. Consequently, during treatments according to this example, the measured data are treated added to the speed of the airplane on the ground and not according to time;
- the presence of so-called contaminant drags, particularly in projection, in displacement and in compression of the contaminant, that contribute to the deceleration of the airplane when it is taxiing on/in a contaminant of a certain depth. The fact of not taking these drag forces into account runs the risk of providing an overestimation of the adhesion of the runway and therefore overestimating the deceleration capabilities for a following airplane. Indeed, these drags and their impact are variable from one airplane to another, for example according to the size of the latter, the height of the wings or the gear architecture, so that they can constitute an important part of the deceleration forces or, on the contrary, turn out to be negligible. On FIG. 3 there has been shown the breakdown of deceleration 30 of an airplane 10 during a landing on contaminated runway 12, into engine thrust 32 (or counterthrust), braking force 34, aerodynamic drag 36 and contaminant drag 38. The impact of projection drags 38 thus can be visualized itself and it is seen that the contribution of these drags can amount to as much as 10% of the total deceleration of the airplane at high speed, beyond 50 $m \cdot s^{-1}$ on FIG. 3, and thus impact the stopping distance by about a hundred meters.

In this context, there is proposed a device for determining a runway state, placed on board an aircraft, comprising measurement means capable of collecting at least one datum on acceleration of the aircraft during a taxiing phase of the aircraft on the said runway. This device comprises in particular:

- a first means for estimating at least one runway state information item from the said at least one measured datum;
- a means for transmitting, to at least one other aircraft, possibly via an appropriate airport broadcasting center, and/or from a broadcasting center, the said at least one runway state information item.

As will be seen in the explanations below, the estimation of the runway state information item can result from several operations performed on various data measured during taxiing, including the deceleration datum.

Figure 4:
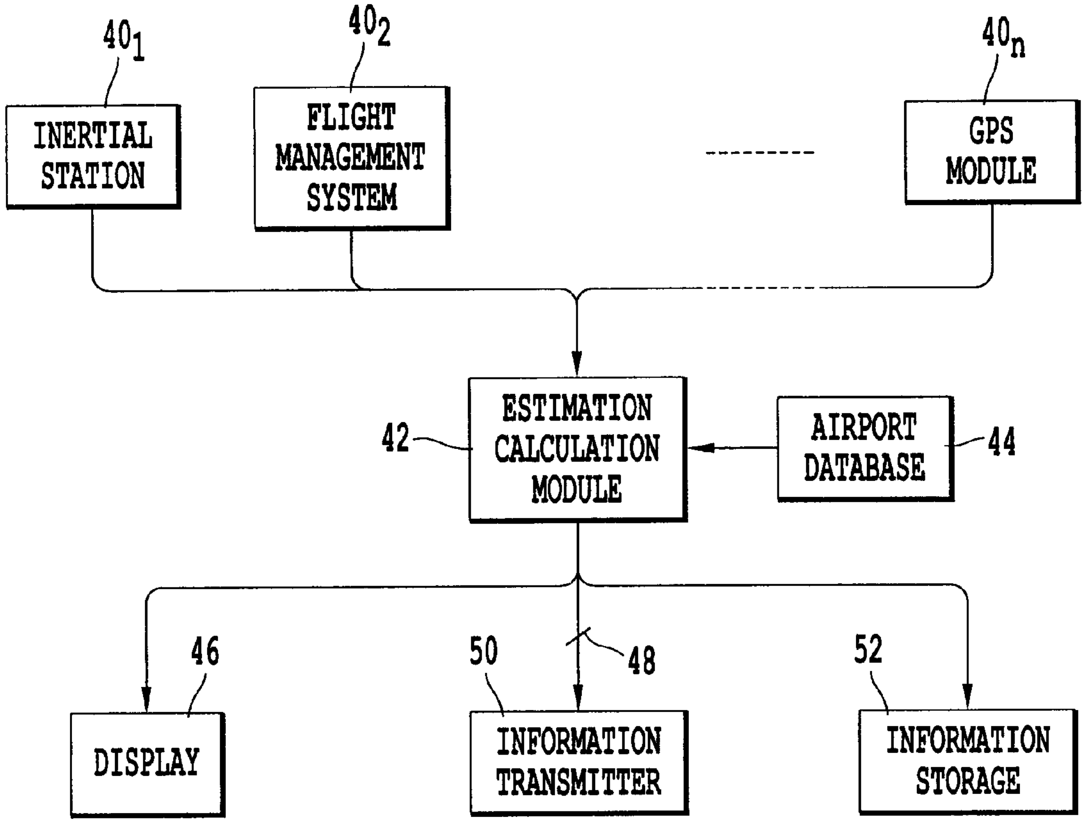
FIG. 4 schematically shows an example of a device that is the object of the invention.

On FIG. 4, an example of device 14 that is the object of the invention provided in airplanes 10 has been shown schematically.

Device 14 comprises a plurality of measurement systems $\mathbf{40}_1$, $\mathbf{40}_2$, . . . , $\mathbf{40}_n$, connected to an estimation calculation module 42.

In particular, the device comprises one or more ADIRS (for "Air Data Inertial Reference System") inertial stations $\mathbf{40}_1$ providing module 42 with measurements of ground speed of the aircraft, position, acceleration and temperature; a flight management system FMS $\mathbf{40}_2$ (for "Flight Management System"); a GPS module $\mathbf{40}_n$ providing the position of airplane 10.

An Airport database 44 connected to calculation module 42 also is provided. This base 44 or airport navigation system OANS (for "On-board Airport Navigation System") provides to module 42 basic airport data and GPS data for the runway. As a variant, the in-flight management system FMS $40_2$ can provide such data.

In general, many data can be provided and used to improve the theoretical models, profiles and other algorithms mentioned below. By way of illustration, module 42 receives (from airport 44 or from other modules $40_i$ of the airplane) the location of the center of gravity CG, the slope of runway 12, the outside temperature, wind data (force and direction), speeds (ground, true aerodynamic and calibrated), altitude data (pressure, . . . ), the mass of airplane 10, airport data, data on the runway used, in particular the GPS coordinates of the runway, GPS position data of the airplane, engine behavior parameters, information items on press-down of brake pedals, on state of movable surfaces (such as the hyper-airfoil devices, the elevator, the airbrakes, the ailerons), Boolean information items representative, for example, of the contact of the main gear on the runway and of the opening of the reverse doors.

It is noted that all or part of these data, mainly those deriving from dynamic data of airplane 10 or from outside conditions, for example, are updated according to time: speeds, engine thrust levels, wind, . . . . It then is provided to identify the measured data by hour and date in order to facilitate the comparison of certain measurements with the ground speed of airplane 10 at the same moment.

These measurements are carried out during the taxiing and braking phase of airplane 10 at landing, for example up to a threshold speed value on the order of 10 knots (or 18.52 $km \cdot h^{-1}$). In particular, measurements and recording of measured data can be started as soon as airplane 10 reaches a preset altitude above the airport. As a variant, the detection of the initial contact of airplane 10 on runway 12 can activate recording of the measured data.

Figure 5:
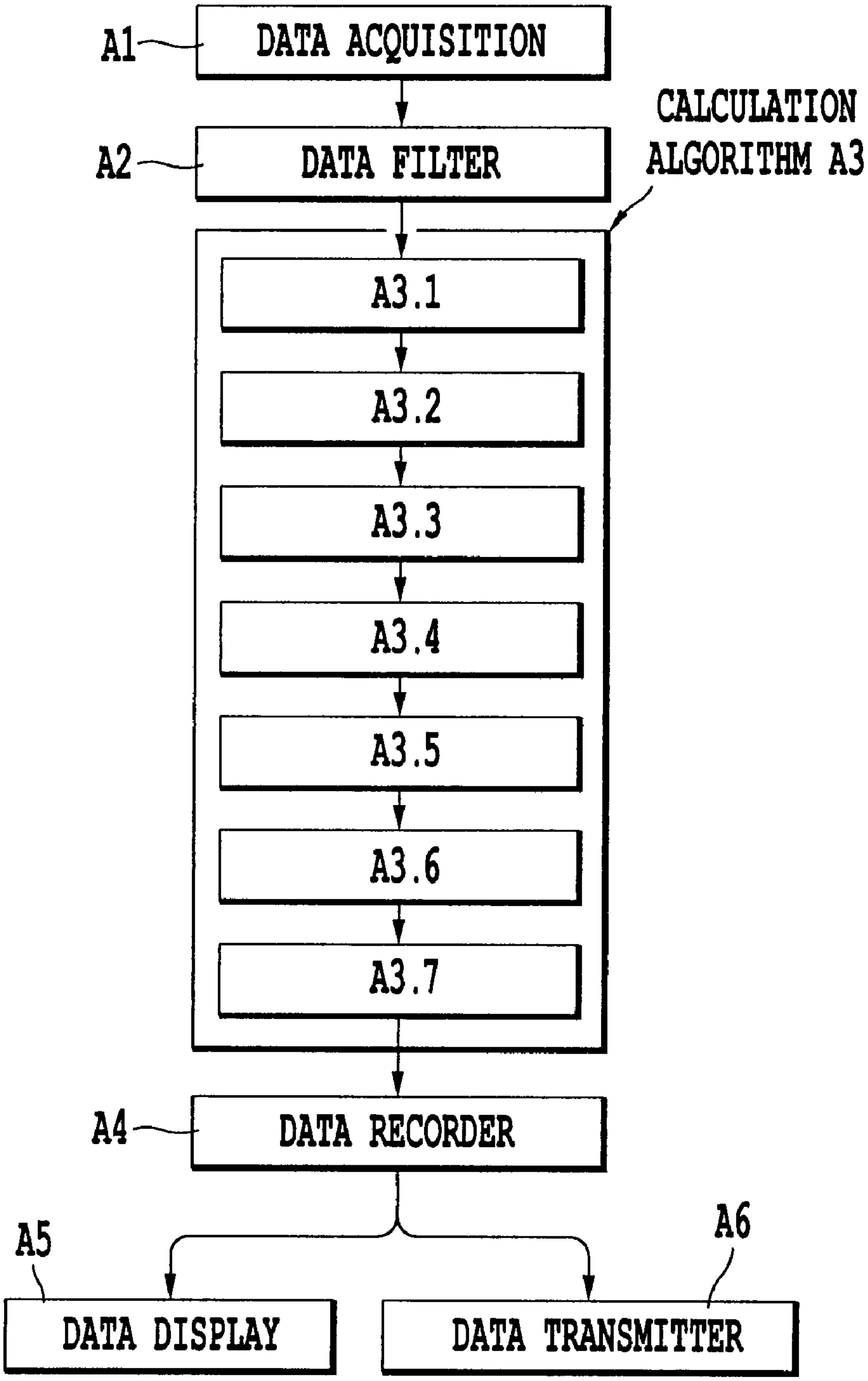
FIG. 5 shows, in the form of a logigram, the treatment steps according to the invention.

Calculation and estimation module 42 then treats all or part of these data according to various steps described below, particularly in connection with FIG. 5. Treatment is initiated as soon as the ground speed of airplane 10 reaches a threshold value, here 20 knots, or approximately 37 $km \cdot h^{-1}$. This makes it possible to treat all the collected data at once.

The result of the on-board treatment for estimation of the state of runway 12 performed by this calculation module 42 is provided in the form of one or more following information items:

- a runway adhesion level. This information item can be a level determined from among the four above levels ("good"/"medium"/"poor"/"nil"), an average adhesion value (for example a coefficient of 0.25) or even an adhesion or sliding profile according to the ground speed of airplane 10;
- a risk of aquaplaning/skidding on the various zones of the runway (or the entire runway, for example, if it is estimated by the system as covered with a certain depth of water) or locally (for example in the presence of a puddle or of a zone contaminated with rubber);
- the presence (or absence) and severity of contaminant drags resulting from a contaminant on runway 12;
- a concise characterization of the runway state encountered (if recognized according to the algorithm implemented in device 14), in particular of the contaminant detected, for example Water 6.3 mm (or Water ¼"), Water 12.7 mm (or Water ¼"), packed-down snow (or Compacted Snow), this runway state designation (generally type and depth of contaminant) being derived from a known nomenclature.

A display 46 of these determined runway state information items is implemented in the cockpit of airplane 10. The pilot then validates (48) or does not validate these displayed data in relation to his judgment and to his visual data, that is, as it were, according to his automatic functions of "Reported Braking Action." The runway state information items validated by the pilot then are transmitted (50) to the outside of airplane 10, to the control and management center of the airport, by standard means, for example radiofrequency.

As a variant, transmission (50) of runway state information items can be automatic without validation from the pilot.

A possible storage (52) of the calculated information items is implemented in airplane 10.

There now is described in reference to FIGS. 5 to 10, an example of the treatments carried out aboard airplane 10 during the during the approach and landing phase on runway 12.

In a step A0 not shown and performed during the approach of airplane 10 for landing, data on estimation of the state of runway 12 are acquired by the on-board system through communication with the airport. These data result in particular from the merging of several runway state information items provided by various airplanes already having landed. This merging makes it possible to provide the temporal and spatial evolution of the runway state for a manual use by the pilot or possibly automatic use by a landing assistance system, of the "Brake-To-Vacate" type (system allowing the pilot to designate and attain an access for runway 12).

For example, a textual display to the pilot of airplane 10, as follows, specifies for an airport and a given runway 32R, the estimations of the two preceding airplanes, here an A330 (commercial name) followed by an airplane Av1 mentioned previously, for three portions of runway 12:

| | | |
|---|---|---|
| LFBO / | 32R | |
| A330 / | 10h32 GMT / | xx/WET/WET |
| A320 / | 10h39 GMT / | WET/WET/xx |

As a variant, a graphic display on an airport map, for example, can be offered after spatial and temporal merging of the data, in particular by using a color code to reproduce the state of various portions of the runway.

Step A1 of acquiring data takes place in part prior to contact of airplane 10 on runway 12, in particular for acquiring fixed data, and in part after contact during the phase, strictly speaking, of taxiing and braking of airplane 10 on runway 12, for acquiring time-dependent dynamic data. This latter acquisition is carried out during the deceleration of the airplane up to a threshold ground speed of 10 knots, for example.

In step A2, the measured dynamic data are filtered and treated in order to eliminate a portion of the noise inherent in the measurements and in the instrumentation, to identify certain sequences (stabilized zones, aquaplaning for example) and to perform specific treatments according to the zones if need be (distinction of transitory conditions and stabilized zones, for example).

Figure 6:
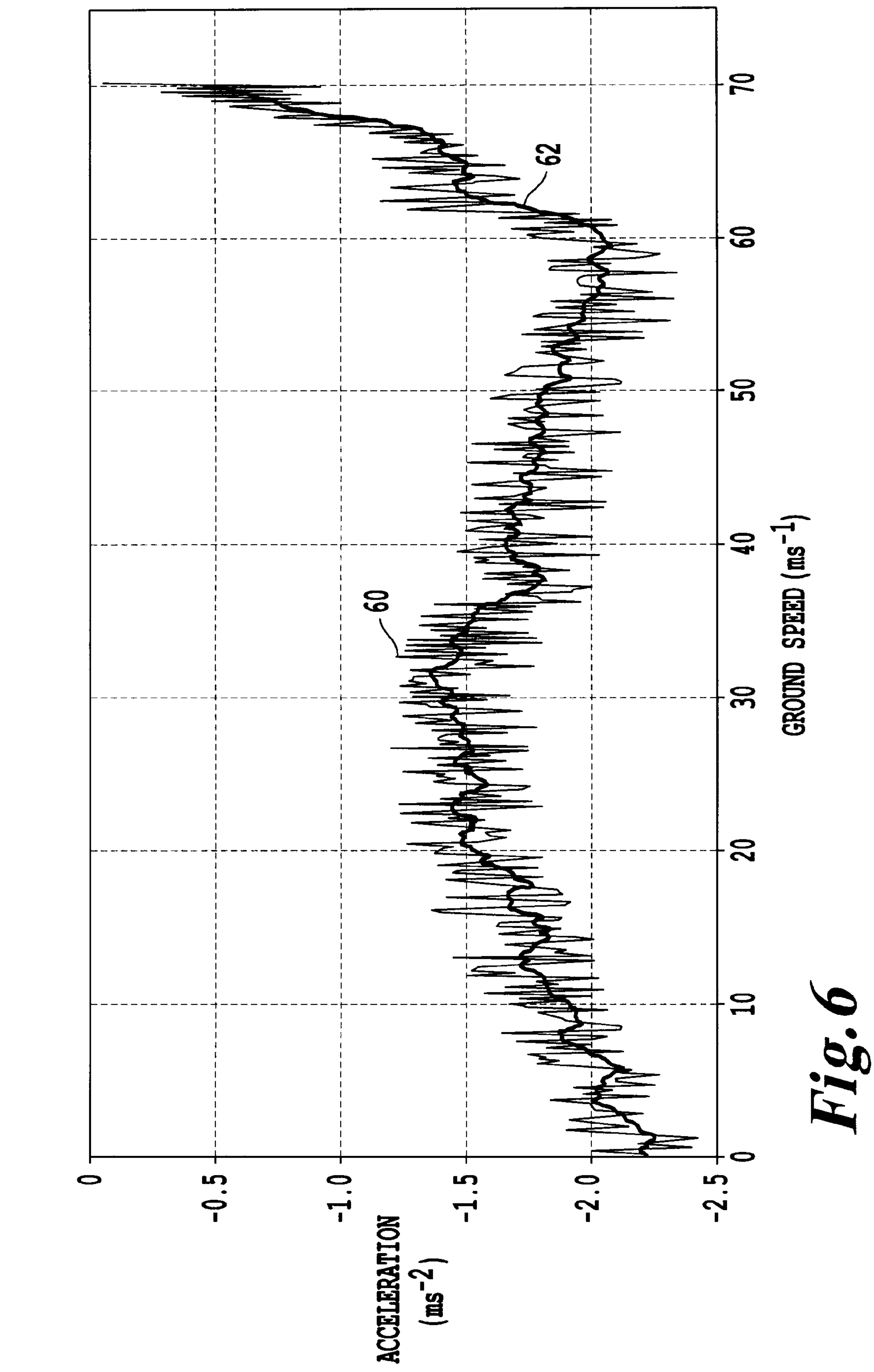
FIG. 6 illustrates a treatment of the deceleration data measured during the process of FIG. 5.

In particular, as illustrated by FIG. 6, the measurements of deceleration 60 originating from ADIRS inertial stations $40_1$ are filtered with a movable means on 10 without time, for example, centered or not centered. Thus there is obtained a smoothed-out deceleration profile 62 making it possible to minimize calculation errors due to extreme noise-added acceleration measurement amplitudes.

It is observed here, as mentioned above, that the measured data are treated according to the ground speed of airplane 10 and not according to time.

As a variant, if different taxiing sequences are identified, the type of filtering can be dependent on the zones identified.

Step A3 consists of the actual calculation algorithm implemented by the module 42 for each sequence of the acceleration profile 60 and for each position on runway 12. This calculation algorithm itself is automatically activated starting from a certain threshold ground speed of airplane 10, for example 20 knots. As it happens, this speed is low enough to be able to benefit from a wide range of measurements for validating the data measured and estimations made, and high enough to be able to provide the results on the state of runway 12 as rapidly as possible for the following airplanes 22. In this connection, two airplanes 10 and 22 generally follow one another by a few minutes, on the order of 1 to 2 minutes, and the treatment provided can be performed by the current computers 42 in approximately one minute.

Figure 7:
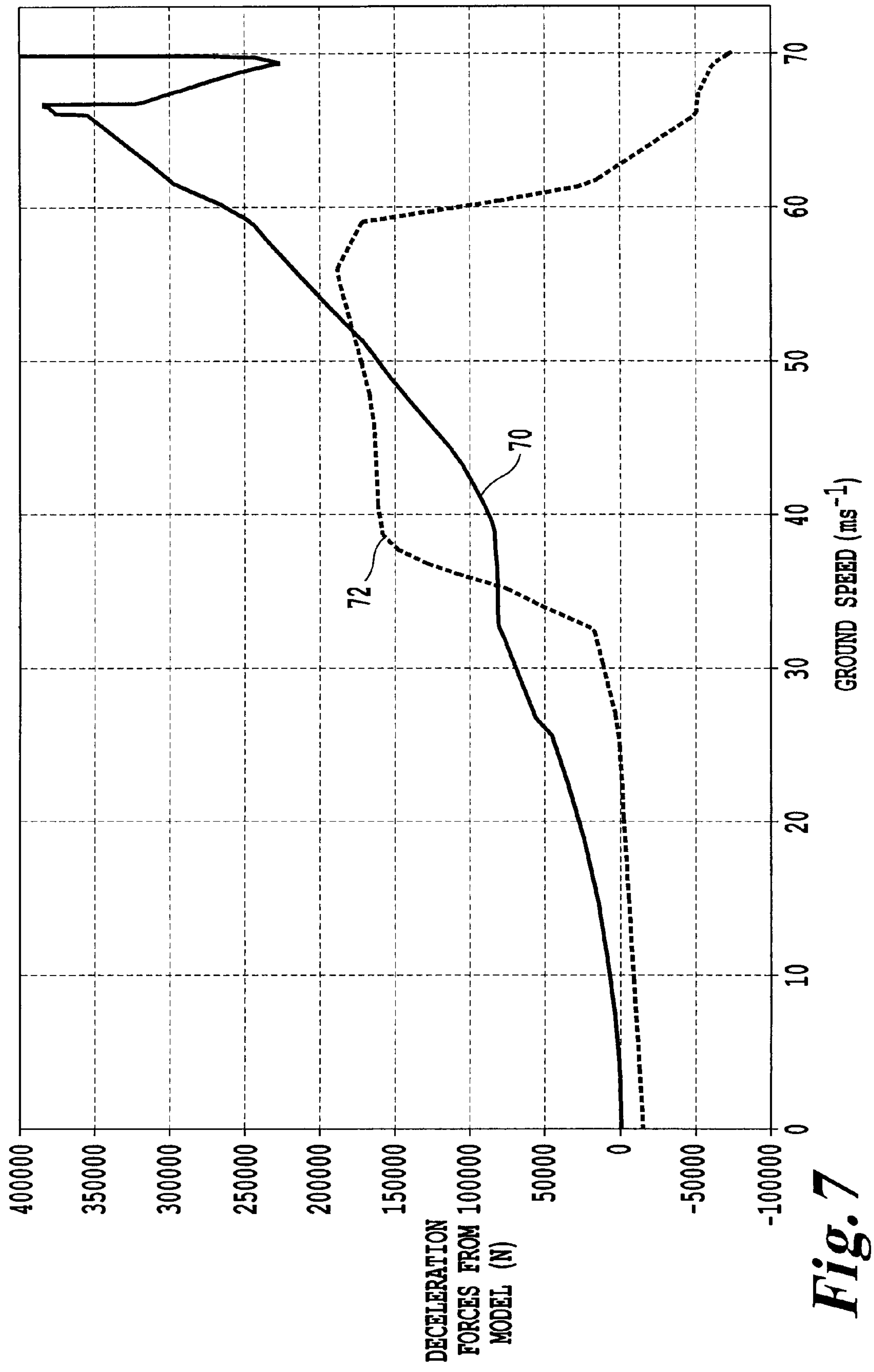
FIG. 7 illustrates the estimation of various contributions to the braking of the airplane during the process of FIG. 5.

In detail, this step A3 comprises a first sub-step A3.1 of estimating a model representative of the braking contributions of airplane 10 and illustrated by FIG. 7.

This estimation is carried out from general data (conditions of the moment: temperature, wind, runway, . . . ) and from data acquired from the airplane (speed, mass, aerodynamic configuration, engine behavior parameters, . . . ). The contributions of aerodynamic drag 70 of airplane 10 and the contributions of engine thrust 72 (as direct thrust or reversers) then are generated from a theoretical model (for example a simplified version of a model from the Flight Manual).

Such generating can be carried out, in particular, for each identified taxiing sequence, for example from contact of the main gear upon emergence of the spoilers, then from the emergence of the spoilers to contact of the nose, and finally from contact of the nose to the start of braking.

There also is generated the profile of vertical stress on the braked wheels of the airplane, according to standard techniques not described here.

Figure 3:
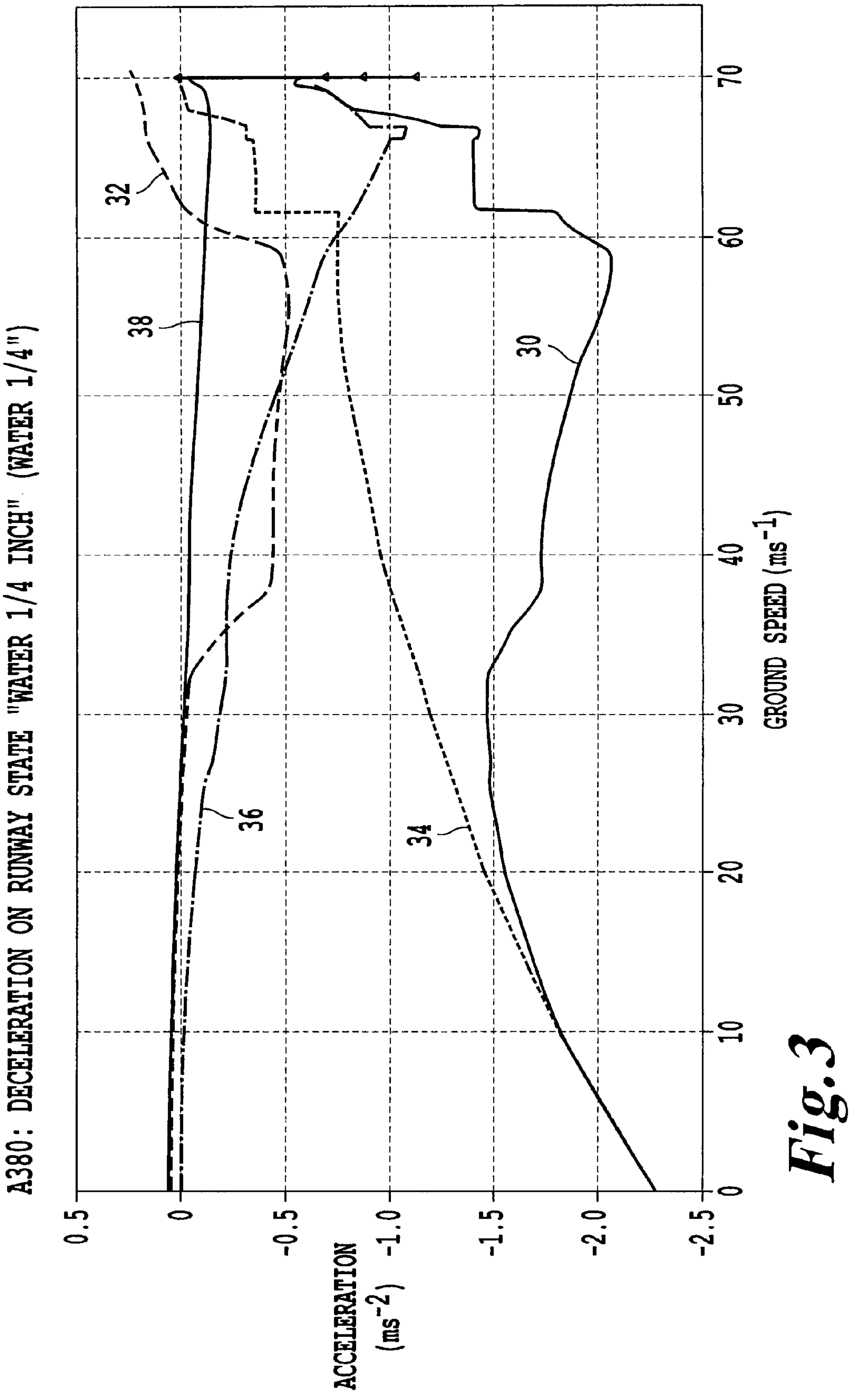
FIG. 3 shows the breakdown of the deceleration of an airplane during a landing on a contaminated runway.

In addition, the possible contribution of contaminant drag 38 also may be generated in similar manner (see FIG. 3).

Figure 8:
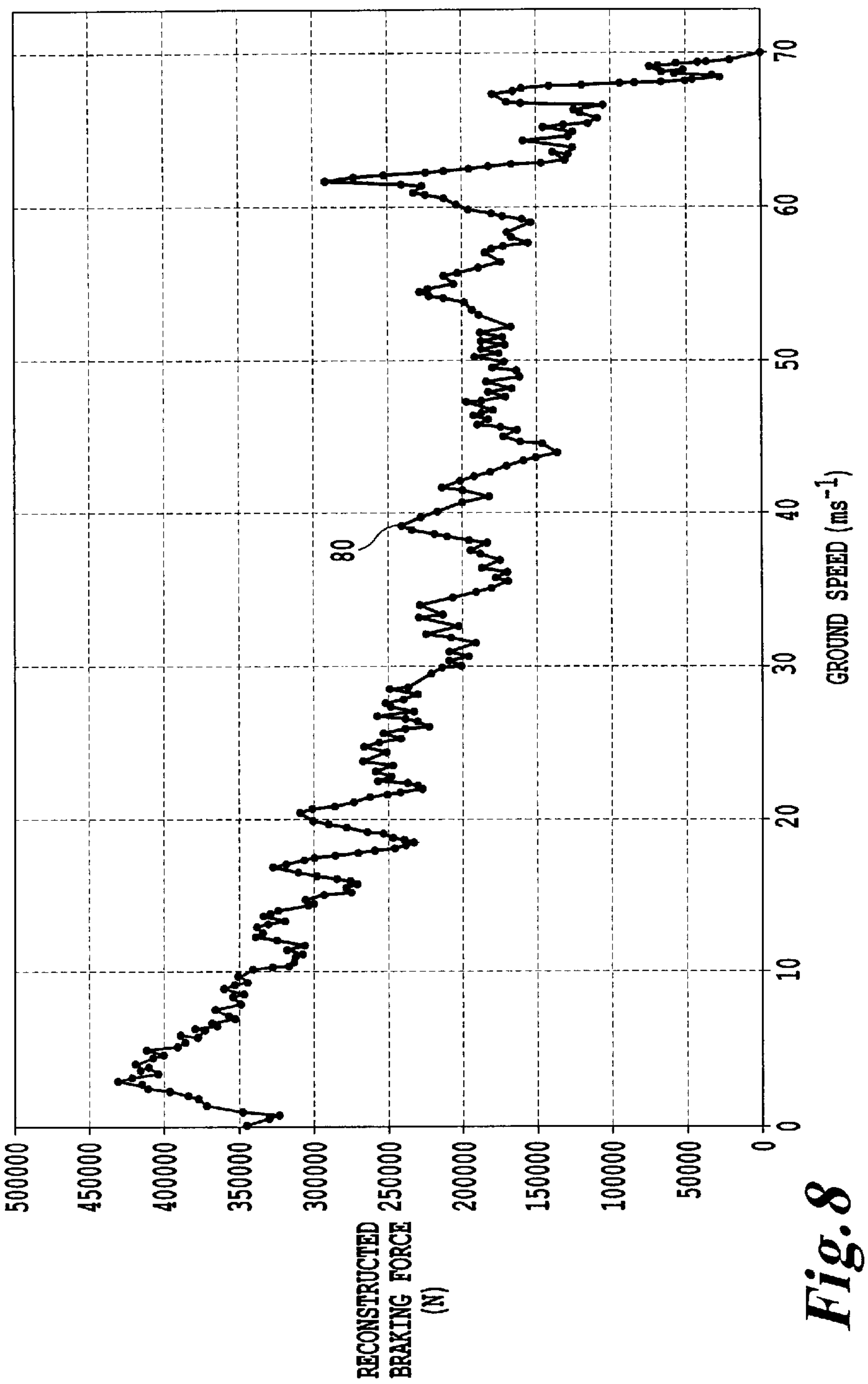
FIG. 8 shows an estimation of the braking force achieved during the process of FIG. 5.

In sub-step A3.2, there then is estimated a braking profile of airplane 10 according to its speed. This profile, already shown in reference 34 of FIG. 3, also is illustrated by FIG. 8 as deriving from profiles 70 and 72 of FIG. 7.

The force of braking 80 of airplane 10 is obtained for each of the ground speeds of the latter by subtracting (in a ratio equal to the measured weight of the airplane) the aerodynamic 70 and engine thrust 72 contributions to the measured deceleration profile 62 of the airplane 10.

According to one contemplated embodiment, the contribution of the contaminant drags 38 can be taken into account in this step to refine the braking $F_{BRK}$ profile 80. As a variant, and as mentioned below in connection with sub-step A3.5, contaminant drags 38 can be taken into account later in the treatment process.

In order to establish a more precise braking profile 80, to the detriment of calculation resources and time, it is contemplated in a more precise embodiment to take into account the taxiing force (which generally is considered to be negligible and therefore not taken into account) as well as the contribution of the weight of airplane 10 according to the slope of runway 12.

Figure 9:
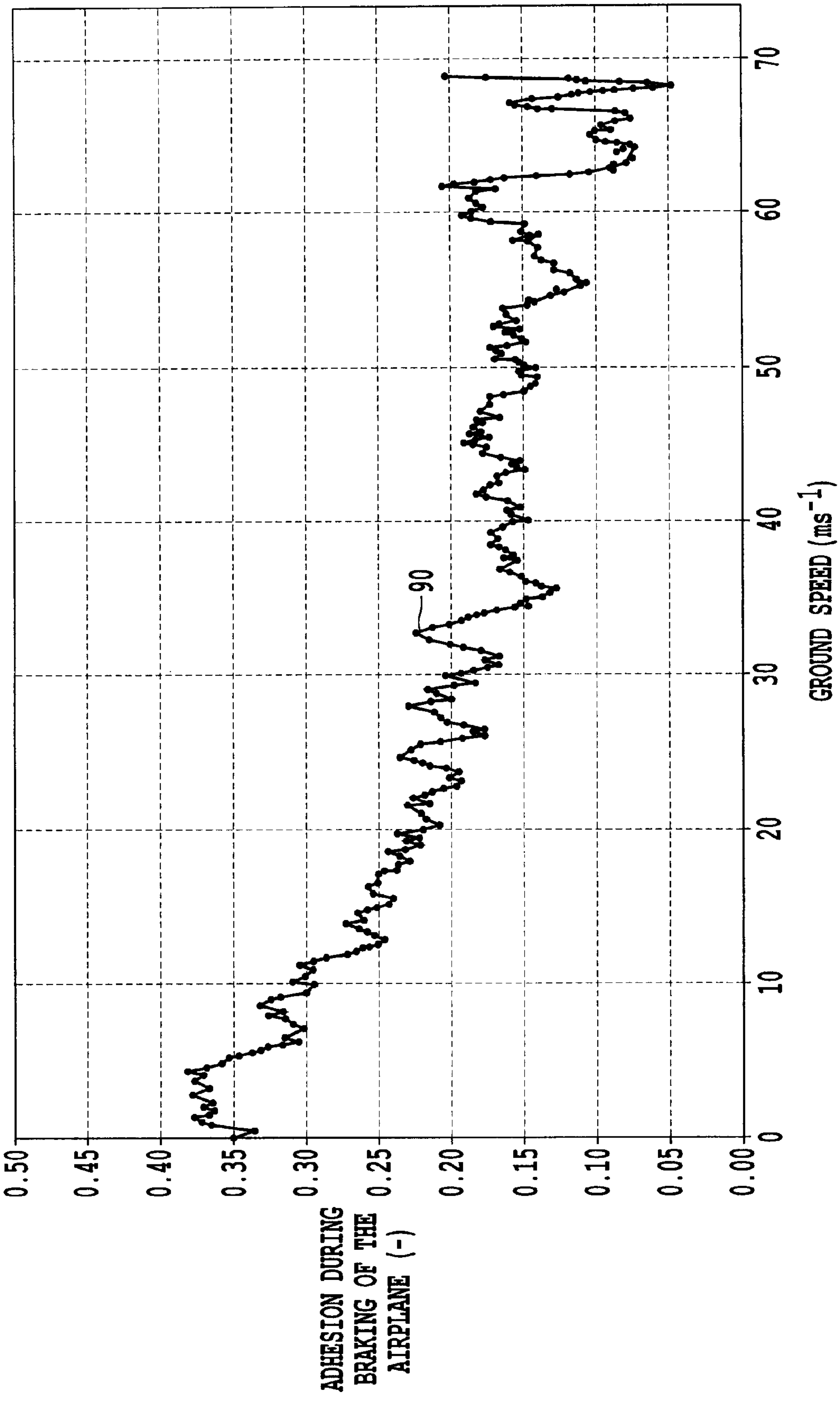
FIG. 9 shows an adhesion profile of the airplane obtained during the process of FIG. 5.

In sub-step A.3.3, there is estimated the level of adhesion of runway 12 as illustrated by FIG. 9. From the estimation of the force of braking $F_{BRK}$ 80, the vertical stress $R_{BRK}$ predicted in sub-step A3.1 on the braked wheels is used to evaluate the mini pure coefficient of adhesion $\mu_{MIN}$ in accordance with the ground speed, such that: $\mu_{MIN}=F_{BRK}/R_{BRK}$.

It is noted here that by virtue of the hour and date identification of the measured data, it is easy to make the connection between each adhesion coefficient of the adhesion profile thus evaluated 90 (here without taking into account the contaminant drags 38) and the corresponding position of airplane 10 on runway 12. As a variant, there can be used techniques of the "Flight Path Reconstruction" or FPR type that make it possible to ensure that the measured data are consistent from a kinematical point of view, for example by making it possible to reduce errors in measurement through a constant or relative bias.

The evaluated adhesion coefficients can result from two different limitations, however, one known as adhesion limitation when the state of sliding or adhesion of the runway limits braking, and the other known as torque limitation when all the braking torque called for at the corresponding controls is released.

In the first case, the calculated coefficient μ is indeed the coefficient of maximal adhesion of the runway at the corresponding location for the corresponding airplane ground speed.

In the second case, if a torque called for by the brake had been greater (whether because of the pedal control, or the maximal brake capacity, or because of the deceleration controlled by the "autobrake"), the braking 80 profile might have been different. In this case, the calculated coefficient μ corresponds to a coefficient of minimal adhesion of the runway at the corresponding location, and not the coefficient of maximal adhesion.

In sub-step A3.4 it is thus provided to determine the state of limitation of braking for each of these calculated coefficients. Simple empirical and/or phenomenological criteria can be used as a basis.

For example, the position of the brake pedal and the pressure obtained can be compared. Knowing the characteristic relating to the theoretical pressure demand according to the pedal position, if the pressure obtained is lower, one then is limited by the anti-skidding (or "antiskid") and therefore it is a matter of a limitation known as adhesion limitation.

In another example that can be devised, the deceleration called for (constant or otherwise, called for by the automatic braking system also known as "autobrake" or a "Brake-To-Vacate" type system) is compared. If the deceleration called for is considerable and it is not attained, then one has adhesion limitation.

Finally in still another example, the signals from the braking regulation ("antiskid") system are picked up.

In the example of FIGS. 6 to 9, braking is achieved with an "autobrake" control having $-3\ m \cdot s^{-2}$ for a deceleration set-point. The deceleration 62 achieved is far from the target value, which nevertheless can be attained on a dry runway. One therefore has an adhesion limitation throughout braking, the estimated coefficient μ therefore is indeed the maximal value associated with this runway 12 for this airplane.

This limitation description is retained with the adhesion profile.

Figure 10:
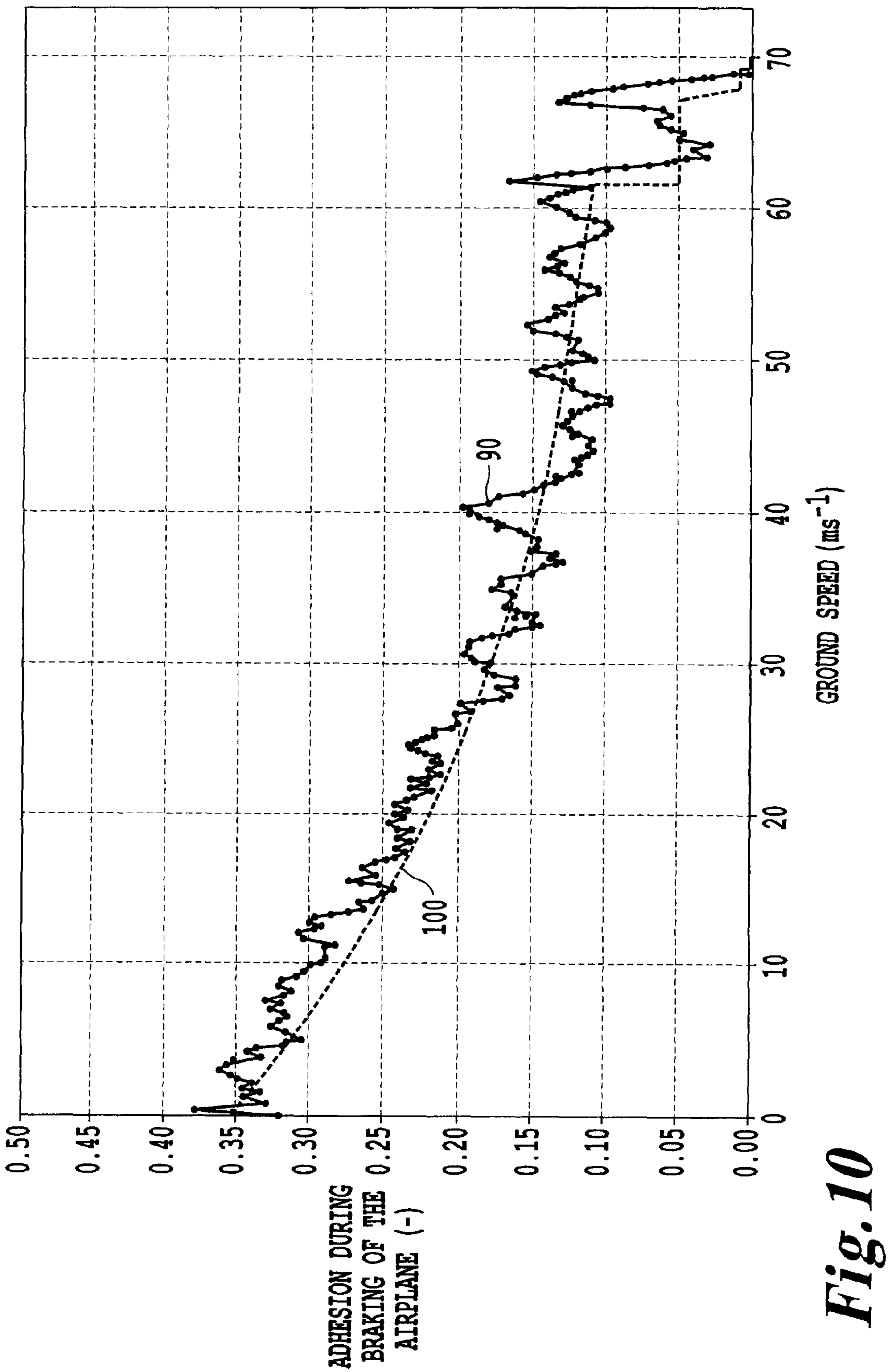
FIG. 10 illustrates a comparison between an adhesion profile estimated during the process of FIG. 5 and a reference adhesion profile.

In the following sub-step A3.5 illustrated by FIG. 10, a concise characterization of the runway state is carried out. Such a concise characterization has the advantage of providing, in a single information item, all the indications necessary for the pilot of the following airplane 22 for evaluating the state of the runway and adapting his landing.

According to the calculated coefficient of adhesion μ all during braking of the airplane, and the ground speeds associated with this datum, this evolution can be compared with known models (theoretical or empirical, regulation or otherwise) of runway states in order to identify an estimate of the current runway state.

In particular, models provided by European regulations can be relied upon, for example the following list: DRY (for dry runway), WET (for wet runway), WATER ¼", WATER ½", SLUSH ¼" (for melted snow), SLUSH ½", COMPACTED SNOW and ICY (for ice).

Thus for each of these models there is calculated the difference between the adhesion coefficient μ of reference 100 and the coefficient μ estimated from measurements 90 (here, the profile takes the contaminant drags into account) over the entire range of speeds. For this purpose, the standard L2 for distance between the two profiles can be used.

As a variant, this calculation may be made separately over the low- and high-speed zones, for example under $Vp-\Delta$ and over $Vp+\alpha$, Vp being the theoretical aquaplaning speed of the airplane, the margin Δ making it possible to avoid overly large errors due to the discontinuity of the aquaplaning speed.

The reference model 100 having the smallest difference with the estimation 90, within the limit of a certain upper margin (the model having to be conservative, i.e. not giving an optimistic indication), is selected as describing the state of runway 12.

In the proposed example, the best correlation with the estimated adhesion coefficient μ is obtained with the reference model Water ¼", taking into account projection/displacement drags (contaminant drags).

In a variant as introduced previously, instead of considering the forces of the contaminant drags in the estimation of the braking force, one can integrate them directly into the reference adhesion profile μ 100 and in this way have only one estimated profile μ 90.

According to one embodiment, some simple transformations can be used in order to better define the evolution or the model most closely approaching the estimation of adhesion profile μ 90. For example, a translation and a homotethy can be applied to take into account a possible slight difference in the data in relation to the reference profile.

In addition, it is possible to use standard identification techniques, in particular identification of the parameters of the model that best represent the measured data, for example by optimization or lesser squares, then validation through an appropriate criteria, for example by residual analysis.

According to one embodiment, in the case of inhomogeneous runways, that is, comprising zones contaminated by rubber, for example, and therefore slippery even for speeds below Vp, those zones can be excluded from the analysis, but not from the final indication on the runway state. Such contaminated zones can be detected easily from the adhesion profile 90, where the coefficient μ is surprisingly low in relation to the ground speed for which it was estimated, in particular when μ is below 0.1.

The process of calculation A3 is continued in sub-step A3.6 by the identification of a risk of aquaplaning. According to the estimated coefficient μ all during braking of the airplane and the ground speeds associated with this datum, it can be estimated whether or not there is aquaplaning (very low adhesion coefficient, lower than 0.1) and whether there is a risk of encountering it on other zones of the runway. As it happens, the phenomenon of aquaplaning is encountered with a very low p, on runways covered with a deep contaminant and for a ground speed in excess of approximately 60 $m \cdot s^{-1}$, in particular according to the type of aircraft.

Thus, the risk of aquaplaning is identified:

either because the airplane really encountered this phenomenon, which can be observed in the case of quasi-nil adhesion for a ground speed in excess of approximately 60 m/s;

or because the contaminant recognized (through the theoretical profile) is a deep contaminant then presenting a risk of aquaplaning (but which the airplane has not encountered by reason of a too-low speed—which is the case for airplane Av1 on FIG. 2).

In sub-step A3.7, the quality and reliability of the estimations of the state of runway 12 made during the preceding sub-steps are evaluated.

Various criteria make it possible to judge the quality and reliability of the estimations provided.

In particular, the noise of the input measurements can be taken into account. In this connection, the signal/noise ratio of the deceleration measurements can be such that uncertainty about the actual measured deceleration value no longer is guaranteed and invalidates the runway state estimation.

Also, comparison with reference models 100 used during sub-step A3.5 makes it possible to test the quality of the data. The ability to correlate a runway state reference model 100 with the estimated profile 90 makes it possible to have confidence in the prediction.

Current conditions (meteo: intensity of crosswind or gusty wind, pilot orders such as joystick or rudder bars orders, failure situation) also are taken into account in the sphere of validity of the on-board model used during sub-step A3.1. For example, if the model does not take into account a joystick input from the pilot (for example in nosing up, which induces an increase in vertical stress on the braked wheels), one then can have an overly high evaluation of the true adhesion. These excursions outside the sphere of validity of the model must be taken into account and then penalize the quality of the results.

From these three criteria, a quality information item is generated, for example:

$$\text{Quality}=f(\text{noise})\times f(\text{correlation})\times f(\text{conditions})$$

The quality information items can take the form of a note (on 3 for example) or of color (red, orange, green).

It is seen that, according to the quality level, the best estimation of runway state can be provided, if need be under the "conservative" criterion, or nothing can be provided if the estimation is considered too inaccurate, for example if one of the functions of the formula sends back 0 by reason of non-validity of the criterion. The quality estimation can apply to all or part of the measurements and estimations.

By way of illustration, other criteria can be taken into account, such as, for example, semi-empirical or phenomenological criteria. The latter, for example those already mentioned in sub-step A3.4 as well as an analysis of the antiskid signals, can make it possible to judge the quality of the estimations. For example, the presence of a torque limitation over all or part of the braking phase can penalize the result by minimizing the level of adhesion estimated over the zone having this limitation.

At the end of the period of taxiing on the runway (starting from a certain threshold ground speed, for example), the estimated data then are recorded automatically in step A4.

Then in step A5, possibly upon action by the pilot, the result of the estimations is displayed on the screen in the cockpit of airplane 10. Depending on the quality and reliability estimated in sub-step A3.7, the pilot can receive one or more of the following information items:

the level of runway adhesion, linking it, as the case may be, to the runway portion concerned;

the risk of aquaplaning/skidding on the various zones of the runway;

the presence (or absence) and the severity of contaminant drags;

the concise characterization of the runway state encountered;

the quality of the estimation provided.

Upon action by the pilot validating all or part of the runway state information items that were offered to him, these are transmitted, in step A6, to the outside of the airplane (control center of the airport or airplanes on approach, for example) accompanied by the quality of the estimations found.

Transmission of the data can be carried out by radio or through a system such as ACARS ("Aircraft Communications Addressing and Reporting System" according to English terminology).

In the above example corresponding to airplane Av2 of FIG. 2, the runway state is clearly identified and provides a level of adhesion according to the speed, over a runway portion (here from 400 to 2000 m starting from the threshold), the risk of aquaplaning and the presence of projection drags.

The information item transmitted then can be presented in the following manner:

Airport XXX, Runway YYY, Airplane ZZZ

Date, Time 400-2000 m starting from contact

Runway state identified as Water (WATER) ¼" estimation quality 3/3.

The preceding examples are merely embodiments of the invention which is not limited thereto.

The invention claimed is:

1. A device for determining a runway state, placed on board an aircraft, comprising:

measurement means for collecting at least one datum on deceleration of the aircraft during a phase of taxiing of the aircraft on the runway;

first means for estimating at least one runway state information item from the at least one measured datum;

means for transmitting, to at least one other aircraft and/or a broadcasting center, the at least one runway state information item, wherein the first means for estimating a runway state information item comprises:

second means for estimating at least one adhesion profile according to a speed of the aircraft, with the aid of the at least one measured datum;

means of comparing the estimated adhesion profile with a series of reference runway state adhesion profiles each corresponding to a runway state characterization;

means for determining at least one runway state characterization according to the comparisons carried out by the comparison means.

2. The device according to claim 1, wherein the runway state adhesion profiles include a contribution relating to a contaminant drag induced by a contaminant corresponding to each of the runway states respectively.

3. The device according to claim 1, further comprising means for determining a quasi-nil adhesion threshold speed, aquaplaning type, skidding threshold speed, in the estimated adhesion profile, the comparison means comprising means for calculating a normed difference between the profiles over a range of speeds excluding a neighborhood close to the threshold speed.

4. The device according to claim 1, wherein the runway state information item is associated with at least one information item on position of the aircraft on the runway.

5. The device according to claim 4, wherein the first estimating means is equipped to undertake estimations by partitioning the runway into a plurality of runway portions according to position information items.

6. The device according to claim 1, further comprising means for estimating a reliability of the data measured or estimations made prior to transmission, the transmission of the estimated runway state information item being carried if the said data measured or estimations made are reliable.

7. The device according to claim 1, further comprising means for validating the estimated runway state information item by a crew member of the aircraft prior to transmission to the broadcasting center.

8. The device according to claim 1, wherein the at least one measured datum comprises a ground speed of the aircraft and a deceleration of the aircraft, the further device comprising second means for estimating an adhesion profile according to the speed of the aircraft, with the aid of the at least one measured datum, the second estimating means comprising:

means for modeling aerodynamic contributions of the aircraft and engine contributions of the aircraft during the taxiing phase, means for determining a braking profile from the data on deceleration and on aerodynamic and engine contributions, the second means for estimating the adhesion profile also determining the adhesion profile according to the braking profile and a modeling of vertical stresses sustained by braked wheels of the aircraft.

9. The device according to claim 8, wherein the second means for estimating the adhesion profile moreover comprises means for modeling contaminant contributions due to a presence of a contaminant on the runway, and determining the adhesion profile according to the modeling of contaminant contributions.

10. The device according to claim 1, wherein the reference runway state adhesion profiles include a contribution relating to a contaminant drag induced by a contaminant corresponding to each of the runway states, respectively.

11. The device according to claim 1, wherein means for filtering of the measured data smoothes out the data over a predetermined time period.

12. The device according to claim 1, further comprising means for filtering the measured data and determining various phases during the taxiing, the first estimating means estimating independently over each of the phases.

13. The device according to claim 1, wherein the first means for estimating a runway state information item is activated from a threshold ground speed of the aircraft.

14. An aircraft comprising at least one device for determining a runway state according to claim 1.

15. An aircraft piloting assistance system, comprising at least one device for determining a runway state according to claim 1, the at least one device being provided in at least one aircraft, and a broadcasting center configured to receive a runway state information item determined by the device and to transmit the received runway state information item to at least one other aircraft.

16. An aircraft piloting assistance system, comprising a plurality of devices for determining a runway state according to claim 1, provided in a corresponding plurality of aircraft, and a broadcasting center configured to:

receive a runway state information item determined by the plurality of devices;

merge the runway state information items received; and transmit at least one runway state information item resulting from the merging to at least one other aircraft, to provide an enhanced runway state mapping to the at least one other aircraft.

17. A method for determining a runway state, implemented on board an aircraft, comprising:

measuring at least one datum on deceleration of the aircraft during a phase of taxiing of the aircraft on the runway;

estimating at least one runway state information item from the at least one measured datum;

transmitting, to at least one other aircraft and/or to a broadcasting center, the at least one runway state information item;

wherein the estimating of a runway state information item comprises:

estimating at least one adhesion profile according to a speed of the aircraft, using the at least one measured datum;

comparing the estimated adhesion profile with a series of reference runway state adhesion profiles each corresponding to one runway state characterization;

determining at least one runway state characterization according to the comparison carried out.

18. A device for determining a runway state, placed on board an aircraft, comprising:

a measurement unit configured to collect at least one datum on deceleration of the aircraft during a phase of taxiing of the aircraft on the runway;

a first estimation unit configured to estimate at least one runway state information item from the at least one measured datum;

a transmitting unit configured to transmit, to at least one other aircraft and/or a broadcasting center, the at least one runway state information item, wherein the first estimation unit comprises:

a second estimation unit configured to estimate at least one adhesion profile according to a speed of the aircraft, with the aid of the at least one measured datum;

a comparison unit configured to compare the estimated adhesion profile with a series of reference runway state adhesion profiles each corresponding to a runway state characterization;

a determination unit configured to determine at least one runway state characterization according to the comparisons carried out by the said comparison unit.

* * * * *